US005378918A

United States Patent [19]

Öttl

[11] Patent Number: 5,378,918

[45] Date of Patent: Jan. 3, 1995

[54] METHOD AND A DEVICE FOR MONITORING A WEB

[75] Inventor: Josef Öttl, Diedorf, Germany

[73] Assignee: Grafotec Kotterer GmbH, Diedorf, Germany

[21] Appl. No.: 831,931

[22] Filed: Feb. 6, 1992

[30] Foreign Application Priority Data

Mar. 5, 1991 [DE] Germany ............................ 4106901

[51] Int. Cl.[6] ............................................ G01N 21/86

[52] U.S. Cl. ...................................... 250/571; 250/561

[58] Field of Search ................ 250/561, 562, 571, 572

[56] References Cited

U.S. PATENT DOCUMENTS 1,999,618 4/1935 Raymond ............................ 192/127

4,186,309 1/1980 Gnuechtel ........................... 250/561

4,309,618 1/1982 Carter, Jr. et al. ................. 250/561

*Primary Examiner*—Paul M. Dzierzynski

*Assistant Examiner*—David V. Bruce

*Attorney, Agent, or Firm*—Harrison & Egbert

[57] ABSTRACT

An apparatus and method for the monitoring of a web in a machine processing such web including at least one sensor positioned along the path of the web. The sensor includes a transmitter for transmitting a monitoring beam to the web and a receiver for receiving part of the monitoring beam returned from the web. The receiver is connected to a signal processor for measuring the interval between the transmitting and the receiving. The signal processor produces a control pulse to the machine when the interval exceeds a predetermined tolerated range. The signal processor is a computer programmed such that the tolerated range is set larger prior to the arrival of the signal than after the arrival.

6 Claims, 1 Drawing Sheet

METHOD AND A DEVICE FOR MONITORING A WEB

BACKGROUND OF THE INVENTION

The invention relates to a method of monitoring a web in a machine processing such web and more particularly a printing press in which a monitoring beam is directed onto the web, and part of the beam returned from the web is received and in which the interval between the transmission of the monitoring beam and receiving the returned part thereof is measured and in the case of such interval exceeding a predetermined tolerated range a control pulse is produced. In accordance with a further aspect the invention relates to an apparatus for performing such method comprising at least one sensor arranged on the path of the web and having on the one hand a transmitter for a monitoring beam directed onto the web and on the other hand a receiver for a reflected part of the beam, which receiver is connected with a signal processing means by means of which the interval between the transmission of the monitoring beam and the reception thereof may be measured and in the case of such interval exceeding a predetermined tolerated range a control pulse is produced.

Up till now operation has been performed with a permanently set tolerated range, which is accordingly effective for all speeds of the web. As long as the web is present within this tolerated range no action is taken. As soon as there ceases to be any web present within the predetermined tolerated range a control signal is produced, which generally is responsible for turning off the machine and/or catching the web and/or severing the web. A disadvantage in this respect is that the web does not run equally smoothly at every speed and often tends to flutter. In the case of a paper web to be printed in a printing press this will generally be the case when the web is being drawn in and while running the printing press up to operating speed. In this respect even owing to its flutter which in order to avoid slow response may not be excessive, there is a danger of the web getting out of the permissible tolerated range, and the consequence of this is that a spurious pulse indicating a break in the web will be produced without such break in fact having occurred.

Although a greater tolerated range would prevent spurious signals from being produced during drawing in the web and running up to speed, during normal operation at full speed it would be responsible for a comparatively slow response, this being undesired. Therefore so far compromises nave been necessary which impair reliability during drawing in the web and running up to operational speed and during normal operation do not provide sufficient safety.

SHORT SUMMARY OF THE INVENTION

Taking this state of the art as a starting point one object of the present invention is hence to provide a method and an apparatus of the type initially mentioned which by the incorporation of simple and low-price means is so improved that optimum monitoring is possible in every operational state.

In order to achieve these and/or other objects appearing from the present specification, claims and drawings, in the present invention the tolerated range which has to be exceeded for a signal to be produced, is made a function of the web speed. In accordance with a further aspect thereof the signal processing means is designed in the form of a computer which is so programmed that prior to the arrival, at the input thereof, of the speed signal another, preferably larger, tolerated range is set than is the case after the arrival thereof.

The advantages which may be attained with the invention are more significantly to be seen in the prevention of the disadvantages initially mentioned. Thus the measures in accordance with the invention lead to a simple possibility of avoiding spurious pulses during phases of operation in which substantial flutter of the wed is to be expected, by setting a larger tolerated range. Nevertheless it is still possible in phases in which quiet running is expected to ensure a quicker response and accordingly a high degree of safety.

It is an advantage if the tolerated range which has to be exceeded for a control pulse to be produced is changed in a stepped form and more particularly in the form of one step. This is responsible for a particularly simple design.

In accordance with a further possible advantageous development of the invention the computer constituting a signal processing device may be so programmed that at least on the arrival of the speed signal the distance existing between the web and the sensor is measured and this distance is able to be set as the center of the preferably smaller tolerated range able to be set after the arrival of the speed signal. These measures are responsible for the advantage of an automatic adjustment of the sensor. Accuracy of fitting is therefore not so significant as has so far been the case. A still further advantage is to be seen in the fact that owing to the said automatic adjustment even in the case of arrangements with a plurality of possible web or paper paths, only a single sensor is necessary for all of them, since the sensor automatically sets itself to the selected path.

Further advantageous developments and convenient forms of the invention will be gathered from the claims and from the following detailed account of one embodiment thereof in conjunction with the accompanying drawings.

DETAILED DESCRIPTION OF THE PREFERRED EMBODIMENT OF THE PRESENT INVENTION

Figure 1:
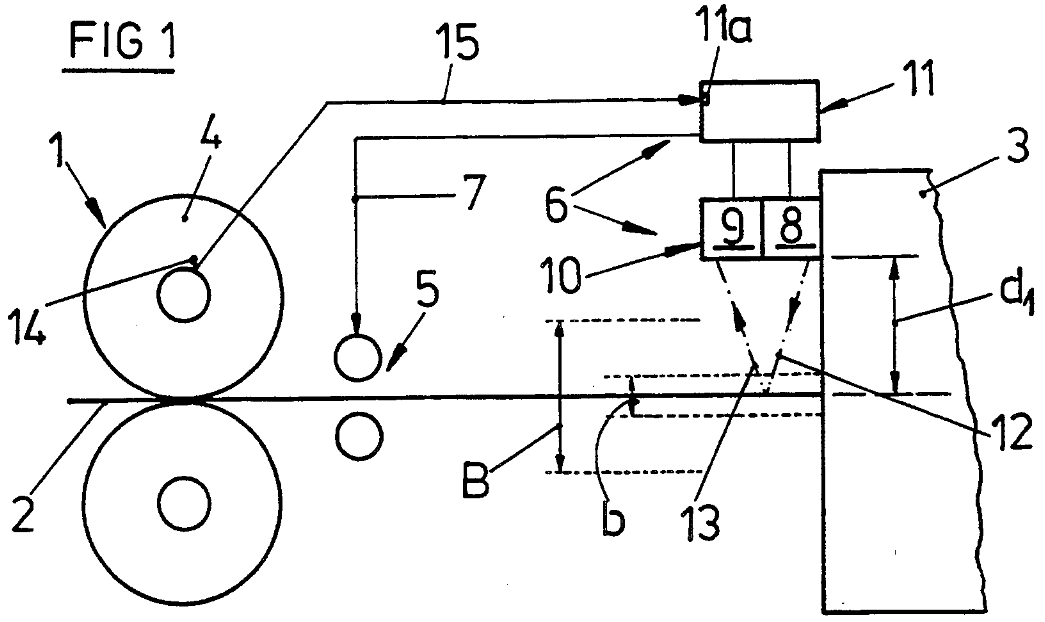
FIG. 1 is a diagrammatic elevation of a web feed rotary printing press fitted with the monitoring system in accordance with the invention in order to operate a web catching device.

The web feed rotary printing press indicated in FIG. 1 by the printing unit 1 for printing a paper wed 2 will generally comprise a plurality of tandem arranged printing units 1, only the last one being illustrated in FIG. 1. Following the last printing unit the web 2 of paper runs through a dryer 3.

In arrangements of this type there is the danger that, following tearing, the paper web 2 will wind itself up onto a cylinder 4 of the printing unit, and possibly cause mechanical damage to the press. Therefore such printing units are fitted with associated web catching devices 5 which are put into operation by an associated web break switch 6, as shown in FIG. 1 by a signal path 7. As shown in FIG. 1 there is a web catching device 5 placed in the delivery part of the last printing unit 1. The associated web break or web tear switch 6 is arranged adjacent to feed side of the dryer.

The web break switch 6 comprises a sensor 10 including a transmitter 8 and a receiver 9, and which is connected with a signal processing device 11, from which the signal path 7 extends. The transmitter 8, which is in the form of a high frequency generator, emits a monitoring beam 12 directed onto the web 2 and which is reflected by the web 2. The reflected beam 13 is received by the receiver 9. The beams 12 and 13 may be beams of light or, preferably, ultrasound beams.

Figure 2:
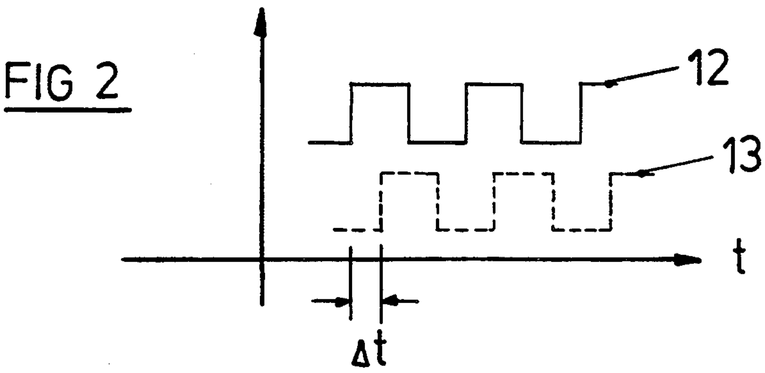
FIG. 2 is a graph with time as the horizontal axis to illustrate the operation of the monitoring beam and the beam from the web.

Between the emergence, indicated in FIG. 2 by a solid line, of the monitoring beam 12 from the transmitter 8 and the corresponding arrival of the reflected beam 13 marked in FIG. 2 in dotted lines at the receiver 9 there is the interval or lapse in time indicated in FIG. 2 equal to Δt. From this difference in time and the speed of propagation of sound it is possible to calculate the distance, The equation (wherein c denotes the speed of propagation, d the distance and Δt the interval or difference in time) for this is as follows:

$$\frac{\Delta t}{2} \cdot c = d$$

In this connection it is to be taken into account that the relative slope between the two beams 12 and 13 is in practice substantially smaller than in the present diagrammatic view.

As long as the time interval Δt measured, and consequently the distance d calculated therefrom is within a permitted range the catching device 5 is not activated. As soon as the term Δt or d ceases to be in the permitted range, no web 2 is detected within the permitted range, this is interpreted as a breakage of the web 2. In this case the signal processing unit 11 connected with the sensor 10 produces a control pulse by means of which the web catching device 5 is activated and the drive of the press is turned off and the brakes are applied to the press.

The necessary calculating operation is performed in the signal processing unit 11. The signal processing unit 11 can be a programmable computer in the form of a microprocessor. It is so programmed that as from a predetermined speed of the web 2 it switches over from a larger range, indicated in FIG. 1 at B for the permissible position of the web 2 and accordingly for the distance d to a smaller range indicated in FIG. 1 at b. The tolerated ranges, resulting from the ranges B and, respectively, b for the permissible position of the web 2, for the distance d between the web 2 and the sensor 10 are indicated it) FIG. 3 at B' and, respectively, b'. It is, as already mentioned, the difference in time from which, in accordance with the above formula, the distance is determined.

Figure 3:
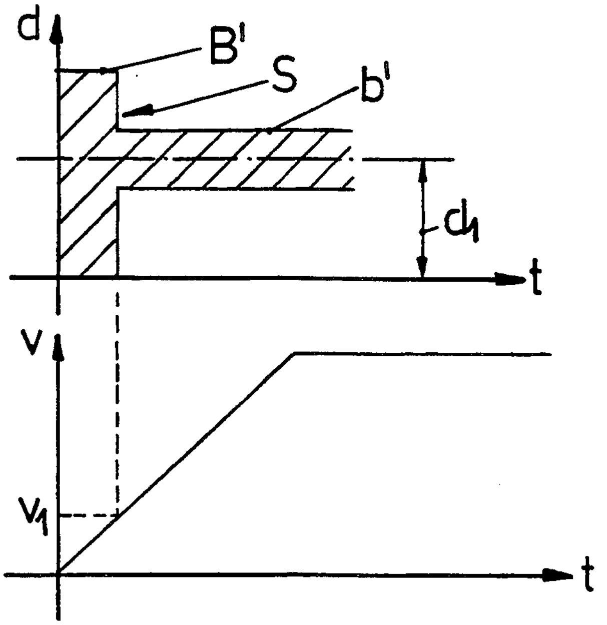
FIG. 3 is a graph with time as the horizontal axis to illustrate the tolerated range as plotted against machine speed.

The switching over from the larger tolerated range to the narrower one may, as shown in FIG. 3 at step S, take place in the case of a web feed printing press of the present type, when the web 2 has been run up to approximately 10% of its final speed. The computer constituting the signal processing unit 11 is accordingly provided with an input 11a for a web speed signal. This input is connected a signal line 15 from the speed sensor 14. As soon as the press has completed the web 2 and has attained the rated speed, the computer constituting the signal processing unit 11 supplies a pulse via the line 15, which causes a switch over from B to b.

This ensures that, as shown in FIG. 3, below a predetermined web speed $v_1$, in the present case equal to 10% of the final speed, a large tolerated range B' applies for the distance d, within which flutter of the web 2 is tolerated without this being responsible for an activation or tripping of the catching device 5. This large size of tolerated range B' is in this case larger than the beats or deflection of the web 2 to be expected when running the machine up to its working speed. As from the rated speed $V_1$ the smaller tolerated range b' applies, within which the web 2 is able to flutter at higher web speeds. It is in this connection assumed that in the case of a web feed printing press of the present type the web 2 will run more smoothly at high speeds than at low ones. Owing to the reduced tolerated range b' in this case upper speed range there is however a short lag time between the occurrence of the web breaking and the response of the catching device 5.

The fitting of the sensor 10 is in such a manner that the theoretical plane of running of the web 2 is generally in the center of the larger tolerated range B'. However inaccuracy in mounting may be responsible for departures, something which however in the larger tolerated range B will not be of substantial significance, as is indicated by the symmetrical position, marked by the broken line in FIG. 3, of the larger tolerated range B'. Within the smaller tolerated range b' these inaccuracies are cut out. For this purpose the computer constituting the signal processing unit 11 so programmed that it takes the distance $d_1$ between the web 2 and the sensor 10, measured on receiving the above noted speed signal as being the center of the smaller tolerated range b'' so that, as shown in FIG. 3, this range is symmetrical to the web plane as marked by the broken line. In this case this is associated with an automatic adjustment independently of the fitting of the sensor. The same applies for a case in which there is a plurality of possibilities as regards the path of the web 2, as is for instance often the case in many paper folders. In cases of this type as well there will be an automatic adjustment of the sensor 10 itself to the respectively selected path of the web 2.

I claim:

1. A method of monitoring a web in a machine processing such a web comprising the steps of:
   transmitting a monitoring beam toward the web;
   receiving a part of the beam returned from the web;
   measuring the interval between the transmitting of the beam and the receiving of the part of the beam;
   producing a control pulse when the measured interval exceeds a predetermined tolerated range, the tolerated range being a function of web speed, the tolerated range changing from a larger tolerated range to a smaller tolerated range with an increase in web speed, said step of producing further comprising the steps of:
      measuring a distance between the web and a receiving sensor upon a transition from the larger tolerated range to the smaller tolerated range;
      storing the measured distance; and
      utilizing the measured distance as a mean value of the smaller tolerated range.

2. The method of claim 1, said step of producing a control pulse further comprising the step of:
   stepingly modifying the tolerated range upon a change of web speed.

3. The method of claim 1, said step of producing a control pulse further comprising the step of:

reducing the tolerated range when a predetermined web speed is attained.

4. An apparatus for monitoring a web in a machine processing such a web comprising:

at least one sensor positioned along the path of the web, said sensor having a transmitter means for transmitting a monitoring beam onto the web and a receiver means for receiving part of the monitoring beam returned from the web, said receiver means connected to a signal processing means, said signal processing means for measuring an interval between the transmitting of the monitoring beam and the receiving of the part of the monitoring beam, said signal processing means for producing a control pulse when the interval exceeds a predetermined tolerated range, said signal processing means being a computer programmed such that the tolerated range is set larger prior to an arrival of a speed signal from the web than after the arrival thereof, said computer programmed such that a distance between the web and the sensor is measured on the arrival of the speed signal, said distance being a mean value of a smaller tolerated range set after the arrival of the speed signal.

5. The apparatus of claim 4, wherein said sensor comprises an ultrasonic transmitter and an ultrasonic receiver.

6. The apparatus of claim 4, said signal processing means for on/off control of a drive of the machine, a web catching device, and a web securing device.

* * * * *